United States Patent

Wirstlin

[11] Patent Number: 4,591,070
[45] Date of Patent: May 27, 1986

[54] ARTICLE DISPENSER ADJUSTABLE FOR DIFFERENT SIZE ARTICLES

[75] Inventor: Arthur N. Wirstlin, Altoona, Iowa

[73] Assignee: Fawn Engineering Corp., Des Moines, Iowa

[21] Appl. No.: 605,859

[22] Filed: May 1, 1984

[51] Int. Cl.$^4$ .................. B65H 3/24; B65H 31/20; G07F 11/16

[52] U.S. Cl. .................... 221/129; 221/131; 221/241; 221/251

[58] Field of Search ............ 221/279, 280, 241, 251, 221/129–131, 123, 124, 126, 127, 272–274, 258, 268, 133, 247, 254, 304, 199, 107–109

[56] References Cited

U.S. PATENT DOCUMENTS

| | | | |
|---|---|---|---|
| 2,698,699 | 1/1955 | Skillman | 221/241 X |
| 2,784,872 | 3/1957 | Lux | 221/241 X |
| 2,847,146 | 8/1958 | Obourn | 221/130 X |
| 3,001,669 | 9/1961 | Tandler et al. | 221/279 X |
| 3,094,242 | 6/1963 | Kay et al. | 221/273 X |
| 4,232,800 | 11/1980 | Martin et al. | 221/241 X |

Primary Examiner—Joseph J. Rolla
Assistant Examiner—Kevin P. Shaver
Attorney, Agent, or Firm—Henderson & Sturm

[57] ABSTRACT

A dispensing apparatus having a tray for holding a plurality of containers to be dispensed and having an elevated shelf for receiving containers which is inclined to cause such containers to move towards the front end of the tray. A stop is disposed at the front of the tray for contacting an intermediate portion of the frontmost one of the containers for preventing the containers from being dispensed until such operation is desired. An ejector is operatively attached to the front of the tray for selectively pushing the frontmost one of the containers over the top of the stop and then resetting itself such that the next frontmost container will be ready to be dispensed when desired.

7 Claims, 6 Drawing Figures

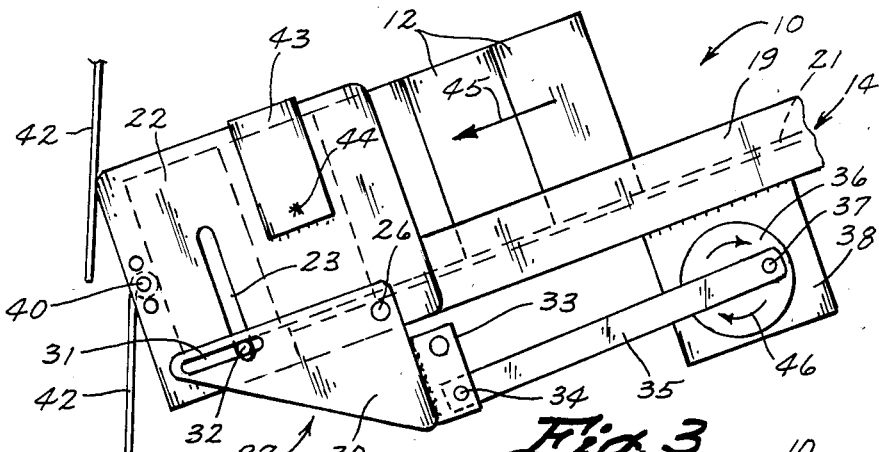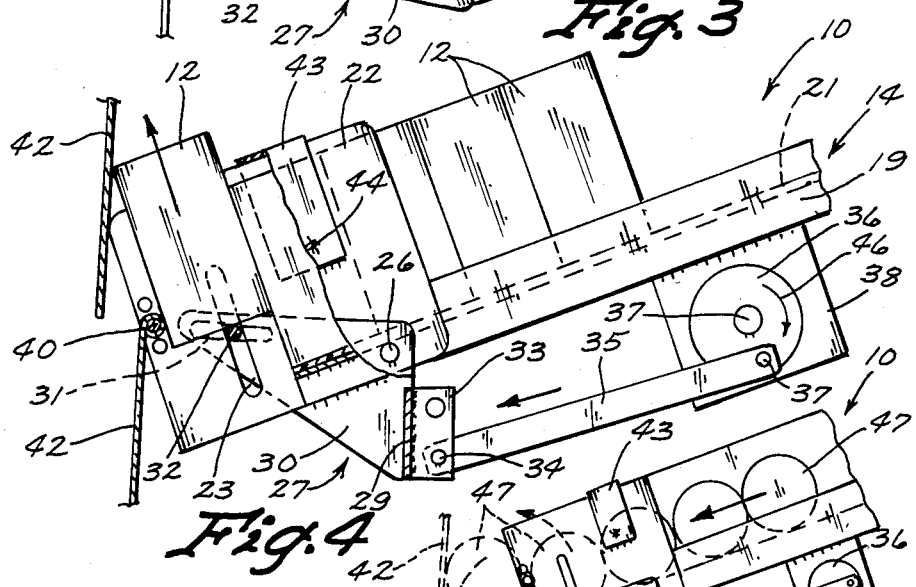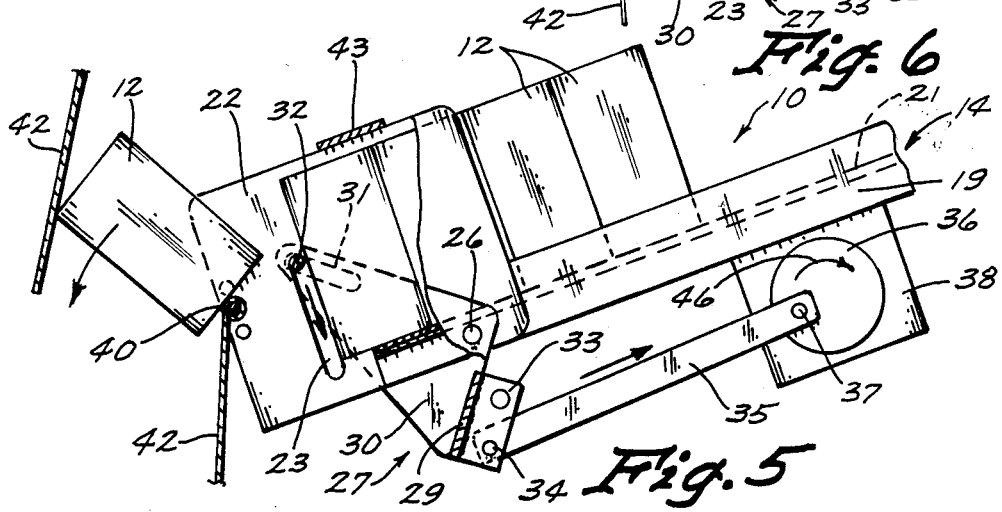

4,591,070

ARTICLE DISPENSER ADJUSTABLE FOR DIFFERENT SIZE ARTICLES

TECHNICAL FIELD

The present invention relates generally to vending machines and more particularly to a dispensing apparatus for a vending machine which will accomodate rectangular containers filled with fluids as well as traditionally shaped cylindrical cans.

BACKGROUND ART

The vending machine art has become highly developed for the purpose of vending soft drinks or juices in cylindrical cans. In recent years, it has become common to package fruit juices or the like in rectangular cartons rather than in a conventional cylindrical can. This situation creates a problem in the vending machine art because the commercially available vending machines have structures that are only useful when used with cans because it requires that the cans roll along a surface. Typically, cans are stacked in an "S"-shaped rack and are required to roll down from such rack to a discharge chute where a particular type of dispensing apparatus is utilized which was designed for use with cans of a cylindrical shape, but which is not useful to dispense rectangular-shaped cartons.

Consequently, there is a need for a vending and dispensing apparatus which can be used for rectangular shaped liquid containers of various sizes and which will also dependably handle cylindrical cans as well.

DISCLOSURE OF THE INVENTION

The present invention relates to a dispensing apparatus having a tray for holding a plurality of containers to be dispensed. An elevated shelf receives containers and is inclined to cause such containers to move towards the front end of the tray. A stop is disposed at the front of the tray for contacting an intermediate portion of the frontmost one of the containers for preventing the containers from being dispensed until such operation is desired. An ejector is operatively attached to the front of the tray for selectively pushing the frontmost one of the containers over the top of the stop and then resetting itself such that the next frontmost container will be ready to be dispensed when desired.

An object of the present invention is to provide an improved dispensing apparatus for vending machines.

Another object of the invention is to provide a dispensing apparatus which is useful to handle rectangular containers full of liquid.

A further object of the invention is to provide a dispensing apparatus which is versatile enough to handle a wide variety of rectangular-shaped containers and will also handle cylindrically-shaped cans of liquid as well.

Other objects, advantages and novel features of the present invention will become apparent from the following detailed description of the invention when considered in conjunction with the accompanying drawings.

BRIEF DESCRIPTION OF THE DRAWINGS

FIG. 3 is a side elevational view of the front of the middle one of the units shown in FIG. 1 with the actuating mechanism in a position of readiness to eject the frontmost one of the series of containers within such unit;

FIG. 4 is a side elevational view like FIG. 3, but showing the ejecting mechanism approximately halfway through the process of ejecting the frontmost container out from the dispensing unit;

FIG. 5 is a view like FIGS. 3 and 4, but showing the ejecting mechanism after just having pushed the frontmost one of the containers in the unit out of the tray and on its way to the delivery chute; and FIG. 6 is a view similar to FIG. 3, but showing cylindrical containers being dispensed instead of rectangular shaped ones.

BEST MODE FOR CARRYING OUT THE INVENTION

Figure 1:
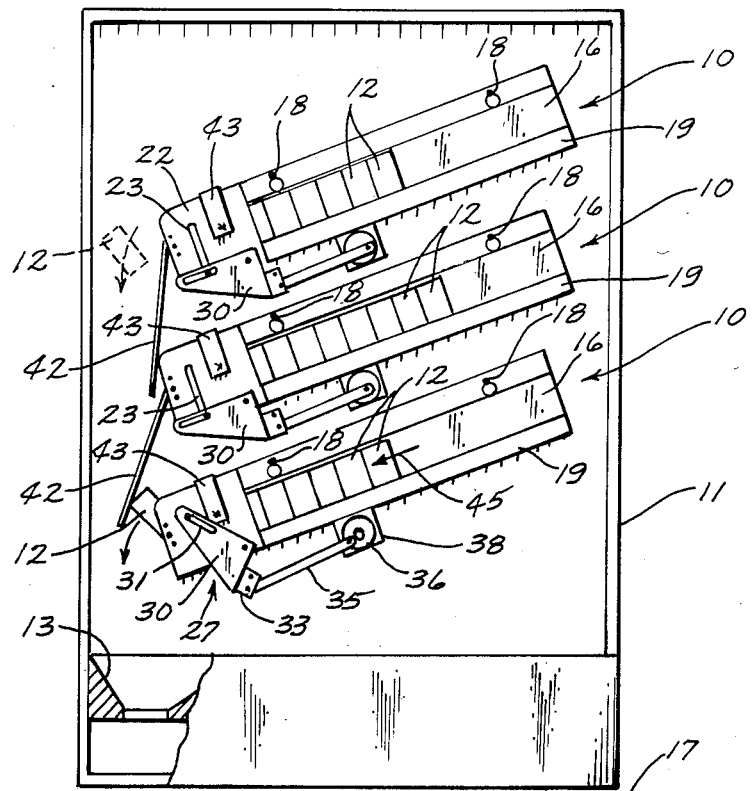
FIG. 1 shows a side elevational view of a preferred embodiment of the present invention.

Referring now to the drawings wherein like reference numerals designate identical or corresponding parts throughout the several views, FIG. 1 shows a plurality of identical dispensing units (10) connected to a frame (11) for the purpose of delivering products such as containers (12) to a delivery chute (13). Each of the units (10) includes a tray (14) having a bottom (15) and elongated sidewall (16) having a flange (17) at the top thereof for attachment to a frame (11) or the like by means of fasteners (18). The other side of the tray (14) has a narrower upstanding edge (19), as can readily be seen in FIG. 2. A pair of "Teflon" shelves (21) are disposed on the floor (15) of the tray (14) for the purpose of elevating the product slightly and also for reducing friction so that the product will slide down across the shelves (21) and not get hung up by friction on the way to the front end of the unit.

The front delivery portion of the tray (14) includes a pair of upstanding flanges (22) which each have a pair of opposed slots (23) therein and three openings (24) therein as well. An opening (25) on each side of the upstanding flanges (22) is adapted to receive a pin (26).

Figure 2:
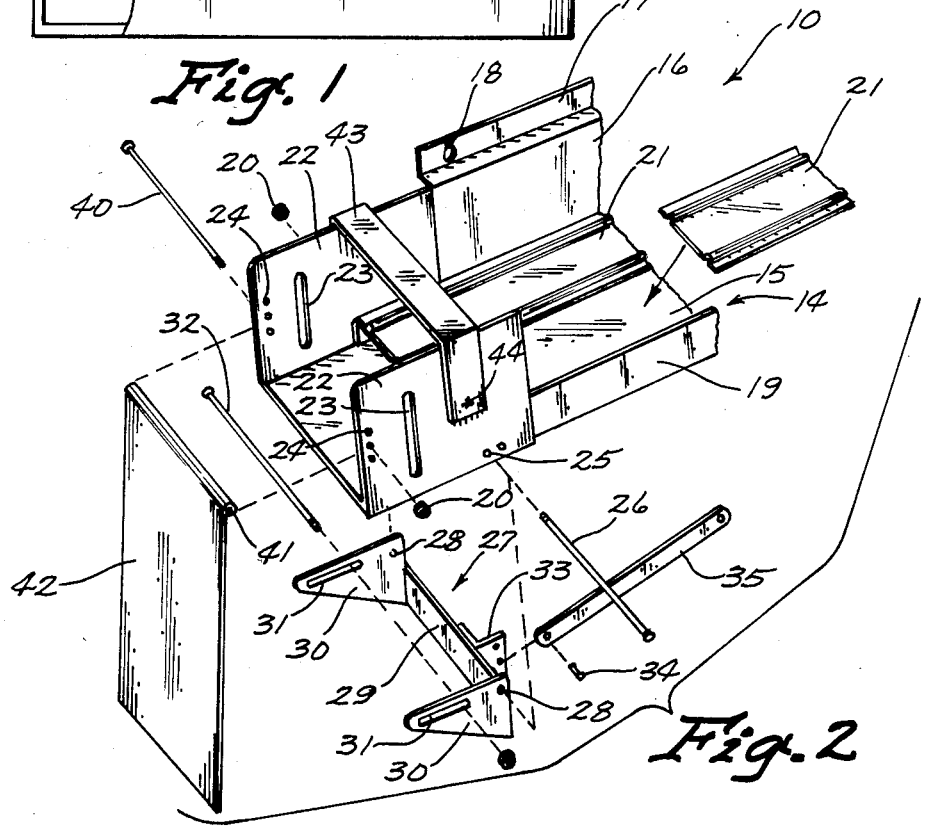
FIG. 2 is an enlarged perspective view of a front end portion of one of the units shown in FIG. 1.

A camming unit (27), which can best be seen in FIG. 2, is pivotally attached to the upstanding flanges (22) by an arrangement wherein the pin (26) extends through openings (28) in the cam unit (27) and also through the openings (25) in upstanding flange (22).

The cam unit includes a base member (29) having a pair of cams (30) attached to each end thereof. Each of these cams (30) has a camming slot (31) disposed therein and a rod (32) extends through each of the slots (31) and through slots (23) of the upstanding flanges (22). A bracket (33) on the camming unit (27) is pivotally attached by fastener (34) to a linkage (35) which is, in turn, pivotally attached to a crank arm (36). This crank arm (36) is rigidly attached to an output shaft (37) of an electric motor (38). A stop pin (40) extends through one of the openings (24) on each side of upstanding flanges (22) and through an opening (41) in a flap plate (42). A metal strap (43) is attached by a spot weld (44) to each side of the upstanding flanges (22) for reasons which will be discussed below.

In operation, a plurality of sealed paper and plastic containers of juice (12) or the like are shown disposed in a line on the tray (14) of each unit (10). These particular containers (12) will move in the direction of the arrows (45) shown in FIG. 3 because of gravity, the incline of each of the shelves on these units (10), and because of the smooth surface of the "Teflon" shelves (21). It will be noted that the trays (21) are prevented from moving forwardly beyond the pin (26) and that the rod (32) will be disposed under the frontmost one of the containers (12). This line of containers (12) will automatically move forwardly until they are stopped against the stop pin (40), or against the edge of the flap (42).

Once a customer chooses the particular product desired, inserts the proper amount of money into the machine, and then pushes a switch (not shown) actuating an actuating mechanism including the motor (38) and the motor (38), the crank arm (36) will rotate one full revolution from the position shown in FIG. 3 to deliver the product (12) to the customer through the discharge chute (13) shown in FIG. 1.

Following the action of the ejection mechanism as described above, it is noted that the pin (32) is again under the frontmost one of the containers (12) and when the crank arm (36) starts to move in the direction shown in the arrows (46), the rod (32) will again begin to rise and push the frontmost container (12) upwardly. This product (12) will pivot flap (42) out of the way and then, as the rod (32) continues to move upwardly to the position shown in FIG. 5, the frontmost product (12) will be high enough to pass over the stop pin (40) and will fall down into the discharge chute (13). The motor (38) will continue to bring the crank arm (36) around in a clockwise fashion as shown in FIG. 5, until it again assumes the position shown in FIG. 3, at which time the motor (38) will shut off automatically. Once this is done, then the containers (12) will slide down the tray (14) until there is another container (12) overlying the rod (32) so that the aforementioned procedure can be repeated whenever the customer deposits the proper amount of money and pushes the actuator buttom (not shown) for that particular tray. It is noted that the strap (43) will prevent the container (12) which is next to the frontmost one of the containers (12) from moving upwardly (FIG. 4) when the frontmost one of the containers is being delivered. Consequently, the customer will receive only the one container (12) which was purchased.

Referring now to FIG. 6, it is noted that if smaller containers such as cylindrical juice cans (47) are to be dispensed from this dispensing apparatus (10), then the flap (42) would be moved downwardly so as to contact the cans (47) more or less in the center thereof. Similarly, if containers slightly larger than the containers (12) shown in FIGS. 3-5 were to be used, than the uppermost pair of the holes (24) would receive the pin (40) instead of the middle one shown in FIGS. 3-5.

Accordingly, it will be appreciated that the preferred embodiment disclosed herein does indeed accomplish all of the aforementioned objects. Obviously, many modifications and variations of the present invention are possible in light of the above teachings. It is therefore to be understood that, within the scope of the appended claims, the invention may be practiced otherwise than as specifically described.

I claim:

1. A dispensing apparatus comprising:
    tray means having sidewalls and a bottom wall for holding a plurality of containers to be dispensed in a line with the bottoms of the containers being in substantial alignment;
    means for causing the containers in said tray means to move towards the front end thereof;
    stop means attached to the front end of the tray means for contacting an intermediate portion of the frontmost one of said containers for preventing the containers from being dispensed until desired;
    ejector means for selectively pushing the frontmost one of said containers over the top of said stop means, said ejector means including a member movable between a first position disposed under the frontmost container when the bottom of the frontmost container is in alignment with the other containers in the tray means, and a second position above the level of said stop means whereby said frontmost container will be delivered to a customer; and
    said ejector means including a rod extending across a front portion of the tray means;
    slot means disposed in the sidewalls of said tray means above said rod for receiving the ends of said rod and for guiding said rod as it is moved between the first and the second positions thereof;
    cam means movable between a first position and a second position thereof for engaging at least one end of the rod for selectively controlling the movement of said rod between the first and the second position thereof, said cam means including at least one plate pivotally attached at one end thereof to said tray means and having a rod receiving slot disposed towards the other end thereof and having said rod disposed in said rod receiving slot; and
    actuation means for selectively moving the cam means from the first position thereof to the second position and back to the first position thereof whereby the rod will also move from the first position to the second position thereof for ejecting the frontmost container and then back to the first position thereof for permitting a new container to assume the frontmost position overlying said rod.

2. The apparatus of claim 1 including means attached to said tray means for preventing the container in juxtaposition to the frontmost container from moving upwardly with the frontmost container when the ejector means is moved from the first to the second position thereof.

3. The apparatus of claim 1 including adjusting means for adjusting the height of said stop means with respect to the frontmost one of the containers in said tray means whereby various sizes of containers can be dispensed by merely changing the adjusting means.

4. The apparatus of claim 1 including flap means attached to the front of said tray means adapted to pivot towards the front end of a second tray means disposed below the first said tray means for guiding a container downwardly to a delivery chute and for permitting ejection of a container from said second tray means whereby the flap means will pivot outwardly when a container from the second tray means pushes against it.

5. The apparatus of claim 1 wherein said actuation means includes an electric motor, a rotary output shaft extending from said motor, and linkage means operatively attached to said rotary shaft and to said plate for moving said plate from the first to the second position and back to the first position thereof during one revolution of said output shaft.

6. The apparatus of claim 5 including switching means for actuating said motor and causing it to turn off after one revolution of the output shaft.

7. A dispensing apparatus comprising:

tray means having sidewalls and a bottom wall for holding a plurality of containers to be dispensed in a line with the bottoms of the containers being in substantial alignment;

means for causing the containers in said tray means to move towards the front end thereof;

stop means attached to the front end of the tray means for contacting an intermediate portion of the frontmost one of said containers for preventing the containers from being dispensed until desired;

ejector means for selectively pushing the frontmost one of said containers over the top of said stop means, said ejector means including a member movable between a first position disposed under the frontmost container when the bottom of the frontmost container is in alignment with the other containers in the tray means, and a second position above the level of said stop means whereby said frontmost container will be delivered to a customer;

adjusting means for adjusting the vertical height of said stop means with respect to the frontmost one of the containers in said tray means whereby various sizes of containers can be dispensed by merely changing the adjusting means, said adjusting means comprising a plurality of pairs of aligned openings in the front of the sidewalls of the tray means and a pin extending through a respective pair of aligned openings; and flap means attached to the front of said tray means, said flap means being adapted to pivot towards the front end of a second tray means disposed below the first said tray means, for guiding a container downwardly to a delivery chute and for permitting ejection of a container from said second tray means whereby the flap means will pivot outwardly when a container from the second tray means pushes against it, said flap means being pivotally attached to said pin.

* * * * *